Sept. 3, 1935.  E. DOBLER ET AL  2,013,435
CONTROL ARRANGEMENT
Filed Nov. 1, 1933
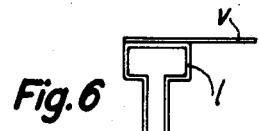
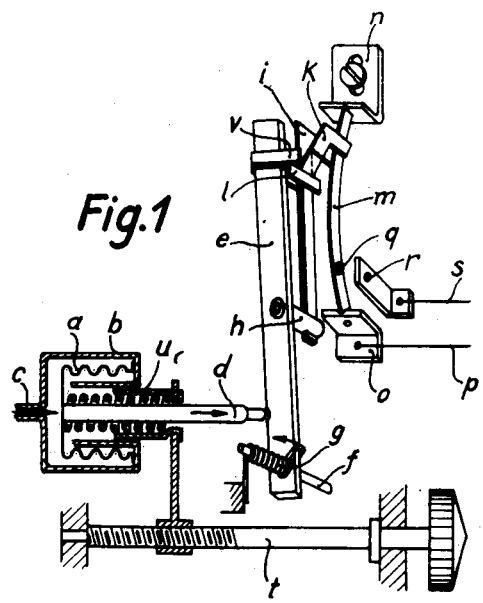
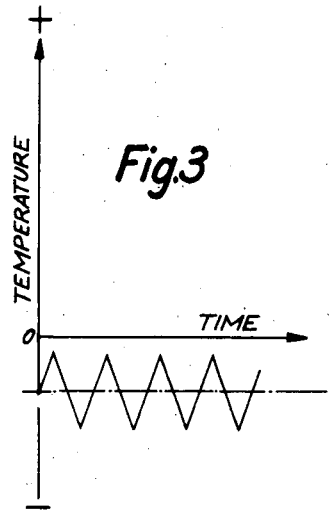
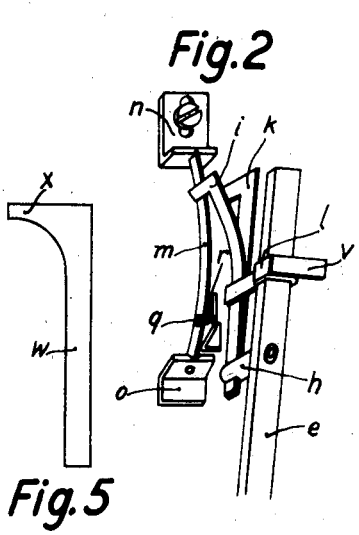
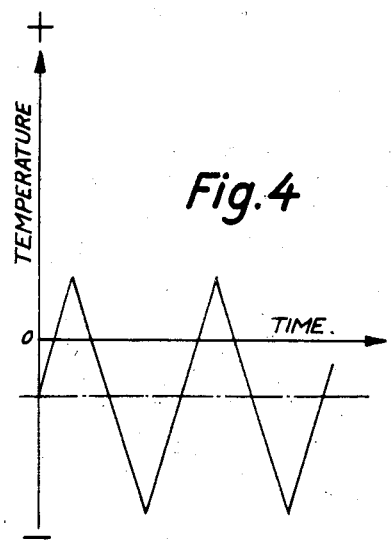
Inventors
Erich Dobler
Friedrich Schulz
Ludwig Holm
by
Steward & McKay
their attorneys Patented Sept. 3, 1935

2,013,435

UNITED STATES PATENT OFFICE 2,013,435

CONTROL ARRANGEMENT

Erich Dobler, Friedrich Schulz, and Ludwig Holm, Stuttgart, Germany, assignors to Robert Bosch Aktiengesellschaft, Stuttgart, Germany Application November 1, 1933, Serial No. 696,282
In Germany November 3, 1932

15 Claims. (Cl. 200—83)

The present invention relates to a control arrangement, which is adapted more especially for the controlling of refrigerating plants.

It is known in control arrangements to employ a snap-over spring having two stable end-positions for the sudden production of switch movements. This snap-over spring is struck by a member, dependent on the position of which the switching operation is to be effected, and flies over from one of its end-positions into the other end-position and in doing so cuts a circuit in or out. Between the snap-over spring and the controlling member, dependent upon whose position a switching operation is to be carried out, a resilient connecting piece has sometimes been arranged. By this means the result is obtained that a controlling operation does not take place on a relatively small movement of the controlling member.

The invention relates to an arrangement in such control devices by which the extent of the elastic deformation of the intermediate member which is necessary for the attainment of the force necessary for the operation of the snap-over spring can be varied.

This step, which is equivalent to an alteration in the spring constants, renders it possible to suitably vary the extent to which the magnitude to be controlled fluctuates about its theoretical value and thus also the number of control impulses per time unit, and adapt it to the particular conditions.

An example of construction of the invention is shown in the accompanying drawing in which:—

Figure 1 is a fragmentary perspective view of a control arrangement for controlling a refrigerator.

Figure 2 shows in perspective a part of the same arrangement in another view and in another position of adjustment.

Figure 3 shows the mode of working of the arrangement in the position of adjustment according to Fig. 1, and Figure 4 in the position of adjustment according to Fig. 2.

Figure 5 shows a special construction of the leaf-spring used in the example of construction.

Figure 6 shows an enlarged plan view of a further detail of the apparatus illustrated.

In Fig. 1, $a$ indicates a resilient member, which is arranged in a casing $b$. The interspace between the walls of the casing $b$ and the resilient member $a$ communicates by a pipe $c$ with the evaporator of a refrigerator. The pressure of the evaporator acts on the resilient member $a$, and more or less compresses it. The movement of the resilient member is transmitted through a pin $d$ to a control lever $e$. The control lever $e$ is pivotally mounted on a pin $f$. A spring $g$ serves for returning the control lever $e$. A pin $h$ is riveted to the control lever $e$, to which pin two leaf-springs $i$ and $k$ are fastened. $l$ is a slide which embraces the two leaf-springs $i$ and $k$ and is slidable on the control lever and the leaf-springs. The two leaf-springs $i$ and $k$ have at their free end a bent portion with which they engage a snap-over spring $m$. The snap-over spring $m$ is supported at its ends in recesses in two bearing-pieces $n$ and $o$. To the bearing-piece $o$ a cable $p$ of the control circuit is connected. On the snap-over spring $m$ is a contact $q$, which cooperates with a counter-contact $r$. The cable $s$ of the control circuit is connected to the contact $r$.

$t$ is an adjusting device, which serves for altering the pressure of the spring $u$. By the adjustment of this spring the pressure is regulated at which the device acts in the middle.

The arrangement works as follows:—

When the pressure rises in the evaporator, the resilient member $a$ contracts and moves the pin $d$ to the right. The pin $d$ presses the control lever $e$ also to the right, and in doing so, carries the two leaf-springs $i$ and $k$ with it. The leaf-spring $i$ bears during this movement against the snap-over spring $m$. Owing to the resistance of the snap-over spring $m$, the free end of the leaf-spring $i$ bends back to the left on the further movement of the control lever until its spring force has become sufficiently great to overcome the force of the snap-over spring $m$. As soon as this condition is reached, it carries the snap-over spring $m$ with it, and this latter suddenly springs over into its other stable position, and in this way cuts in the control circuit through the contacts $q$ and $r$.

This position of the snap-over spring is shown in Fig. 2. In order to enable the snap-over spring to be better seen, the perspective view is drawn as seen somewhat to the left of the control lever $e$. A current now flows by the contacts $q$ and $r$ through the cables $p$ and $s$ of the control circuit, and starts the motor of the compressor of the refrigerator. By its operation the evaporator pressure is reduced again, so that the resilient member $a$ and with it the pin $d$ moves to the left. Under the influence of the spring $g$ the control lever $e$ also moves to the left. In this movement the leaf spring $k$ now bears against the spring $m$. When the pressure of the leaf-spring $k$ is sufficient the snap-over spring springs back into its first stable position and thereby suddenly opens the control circuit, so that the compressor motor of the refrigerator is again switched off.

In Figure 1 the slide $l$ has a position in which it engages the leaf-springs fairly close to their free end. The spring constant of the free springy ends of the leaf-springs is consequently comparatively great. It therefore requires no great movement of the control lever to cause the spring $m$ to fly over into its other end position. If however, the slide $l$ is displaced, for example, into a position such as shown in Figure 2, the magnitude of the spring constant of the free ends of the leaf-springs is thereby considerably reduced. It now requires a substantially longer movement of the control lever $e$ until the force of the leaf-spring bearing on the snap-over spring $m$ is sufficiently great to cause the snap-over spring to fly over. In this way, that is to say, by altering the adjustment of the slide $l$, the extent by which the pressure of the evaporator, and thus also the temperature of the refrigerator, varies about its mean value can consequently be suitably altered.

In Figure 3 is indicated the temperature of the refrigerator in dependence on the time for the slide adjustment shown in Figure 1, and in Figure 4 for the slide adjustment shown in Figure 2. It will be seen that in the adjustment according to Figure 1 the differences in temperature are substantially less than in that according to Figure 2. For this, however, the compressor motor must be put in operation much oftener, since during the time in which the temperature sinks the motor is cut in. These times are substantially longer in Figure 4 than in Figure 3. Consequently, in the arrangement shown in Figure 2, on the other hand, the motor is also much longer at rest than in the arrangement according to Figure 1.

If, during the adjustment of the slide $l$, it is desired to obtain a steady alteration of the control system, it is necessary that during an adjustment of the slide the spring constant of the leaf-springs $i$ and $k$ should steadily vary. This can be done by giving the leaf-springs a form, such as shown in Figure 5, in which the cross section of the spring has no sudden variations in cross section along its length but enlarges smoothly from the narrow part $w$ to the broad part $x$.

As will be seen from Figure 1, the bearing-piece $n$ has an elongated hole for the fastening screw, so that the distance apart of the two bearing-pieces $n$ and $o$, and thus also the distance of the points of support of the snap-over spring can be varied. By an adjustment of the bearing-piece $n$, the compression of the snap-over spring and thus also the rhythm of the control is altered. This adjustment of the compression of the snap-over spring serves for the coarse adjustment, whilst the alteration by means of the slide $l$ serves for the fine adjustment. The distance between the points of support of the snap-over spring can also be altered by a bolt, which is screw-threaded and to which the two bearing-pieces, one of which is movable, are connected.

In order to prevent the leaf-spring $i$ being bent too far and thereby damaged by a very great pressure acting on the resilient member $a$ it is advisable to limit the movement of the control member $e$ by a stop. This can be done in a simple manner by a stop $v$ being provided on the slide $l$, as shown in Figure 6, which on a too great movement of the control member $e$ strikes against a wall of the casing of the controller.

The arrangement described is suitable, of course, not only for the control of refrigerating plants, but also for control arrangements of any kind in which it is a question of being able to adjust, at will, the rhythm of the control.

We declare that what we claim is:

1. Control apparatus comprising a control member, actuated by a factor to be controlled, a first resilient member connected to said control member, a second resilient member having two positions of equilibrium, operated by said first resilient member, means whereby the spring strength of at least one of said resilient members can be varied, and means whereby said second resilient member alters the factor being controlled.

2. Control apparatus comprising a control member, actuated by a factor to be controlled, a resilient member connected to said control member, a snap-over spring having two positions of equilibrium, operated by said resilient member, means whereby the effective length of said resilient member can be varied, and means whereby said snap-over spring alters the factor being controlled.

3. Control apparatus comprising a control member, actuated by a factor to be controlled, a leaf spring connected to said control member, a snap-over spring having two positions of equilibrium, operated by said leaf-spring, means whereby the effective length of said leaf spring can be varied, and means whereby said snap-over spring alters the factor being controlled.

4. Control apparatus comprising a control member, actuated by a factor to be controlled, a snap-over spring having two positions of equilibrium, a leaf spring bearing loosely upon said snap-over spring and connected to said control member, means whereby the spring strength of at least one of said springs can be varied, and means whereby said snap-over spring alters the factor being controlled.

5. Control apparatus comprising a control member, actuated by a factor to be controlled, a pair of leaf springs connected to said control member, a snap-over spring having two positions of equilibrium, operated by said leaf springs, a slide mounted on said control member, which clamps said leaf springs fast and thus enables the spring strength of said leaf springs to be varied, and means whereby said leaf springs alter the factor being controlled.

6. Control apparatus comprising a control member, actuated by a factor to be controlled, two leaf springs of shape such that an alteration in their effective length produces a constant alteration in spring strength connected to said control member, a snap-over spring having two positions of equilibrium, operated by said leaf springs, a slide mounted on said control member adapted to vary the effective length of said leaf springs, and means whereby said snap-over spring alters the factor being controlled.

7. Control apparatus comprising a control member, actuated by a factor to be controlled, a resilient member connected to said control member, a snap-over spring member having two positions of equilibrium operated by said resilient member, supports for said snap-over spring member, means for adjusting the distance apart of said supports, and means whereby said snap-over spring member alters the factor being controlled.

8. Control apparatus comprising a control member, actuated by a factor to be controlled, a snap-over spring member having two positions of equilibrium, a spring member mounted on said control member, one end of which is connected on either side to said snap-over spring member, means whereby the spring strength of at least one of said spring members can be varied, and means whereby said snap-over spring member alters the factor being controlled.

9. Control apparatus comprising a control member, actuated by a factor to be controlled, a first resilient member connected to said control member, a second resilient member having two positions of equilibrium, operated by said first resilient member, means whereby the spring strength of at least one of said resilient members can be varied, a stop adapted to limit the path of the control member and means whereby said second resilient member alters the factor being controlled.

10. Control apparatus comprising a control lever, actuated by a factor to be controlled, a pair of leaf springs mounted on said lever, a snap-over spring member having two positions of equilibrium, operated by said leaf springs, means whereby the spring strength of at least one of said springs can be varied, and an electric circuit closed by said snap over spring member and means whereby said circuit alters the factor being controlled.

11. Control apparatus comprising a control lever, actuated by a factor to be controlled, a first resilient member connected to said control member, a second resilient member having two positions of equilibrium, operated by said first resilient member, a stop on said control lever, means whereby the spring strength of at least one of said resilient members can be varied, and means whereby said second resilient member alters the factor being controlled.

12. Control apparatus comprising a control member, means responsive to pressure for operating said control member, a spring-loaded switch member having two positions of equilibrium, resilient means operatively connecting said control member and said switch member, and means for varying the effective strength of said resilient means.

13. Control apparatus comprising a control member, means responsive to pressure for operating said control member, a resilient member connected to said control member, a spring-loaded switch member, having two positions of equilibrium, operated by said resilient member, and means for varying the spring strength of said resilient member.

14. Control apparatus comprising a control member actuated by a factor to be controlled, a resilient member, having two positions of equilibrium, operated by said control member, means for varying the spring strength of said resilient member, and means whereby said resilient member alters the factor being controlled.

15. Control apparatus comprising a control member actuated by a factor to be controlled, a first resilient member connected to said control member, a second resilient member, having two positions of equilibrium, operated by said first resilient member, means whereby the spring strength of the first resilient member can be varied, means whereby the spring strength of the second resilient member can be varied, and means whereby the second resilient member alters the factor being controlled.

ERICH DOBLER.
FRIEDRICH SCHULZ.
LUDWIG HOLM.